May 15, 1962 R. G. BROOKS ETAL 3,034,733

IRRIGATOR

Filed Jan. 5, 1961

INVENTOR.
RAY G. BROOKS
GERALD D. TURNBLOM
BY
ATTORNEY

United States Patent Office 3,034,733
Patented May 15, 1962

3,034,733
IRRIGATOR
Ray G. Brooks, Tucson, Ariz. (805 W. Chestnut, Denison, Tex.), and Gerald D. Turnblom, 3732 E. 37th St., Tucson, Ariz.
Filed Jan. 5, 1961, Ser. No. 80,829
1 Claim. (Cl. 239—542)

This invention relates to irrigating devices and more particularly to a relatively small device which may be placed on the end of an ordinary garden hose to minimize water pressure at the point of delivery without decreasing the volume of water delivered.

In the watering of flower beds, lawns, and the like, a common practice is to use an irrigating device of a type which introduces a relatively large volume of water at or around the roots of plants instead of being sprinkled over them. These irrigating devices have been designed to overcome the problem of delivering a relatively large volume of water to a plot to be irrigated without washing away part of the soil. Irrigating devices functioning to reduce pressure while not restricting flow have been suggested in the past. Among them are the tubular irrigators shown in U.S. Patents Numbers 2,420,958, 2,644,719 and 2,760,819. Although these devices of the prior art are generally satisfactory, they do have certain drawbacks. While they reduce pressure without restricting flow, they do not uniformly distribute the water from the entire outer circumference of the irrigating device. Moreover, they do not break the water up into sufficiently small particles to minimize washing away of the soil.

We overcome these drawbacks by providing a tubular irrigator having an aeration chamber at the inlet end and baffles adjacent outlet perforations placed in longitudinal rows around the outer circumference of the irrigator.

A principal object of our invention, therefore, is to provide an improved irrigating device in which relatively high pressure water may be received and delivered in maximum volume to a point of use at a minimum pressure.

Another object of the invention is to provide a device of the type described which may be produced economically and thereby sell at a low cost.

A further object of the invention is to provide a tubular irrigating device having an aeration chamber and outlet baffles.

Still another object of the invention is to provide an irrigating device which breaks the water up into much smaller drops than heretofore possible.

Figure 1:
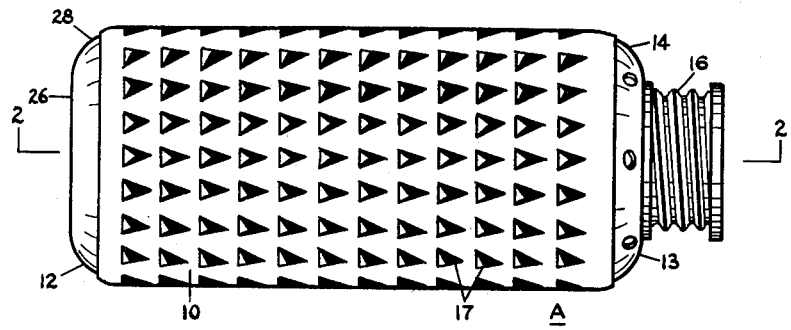
Figure 2:
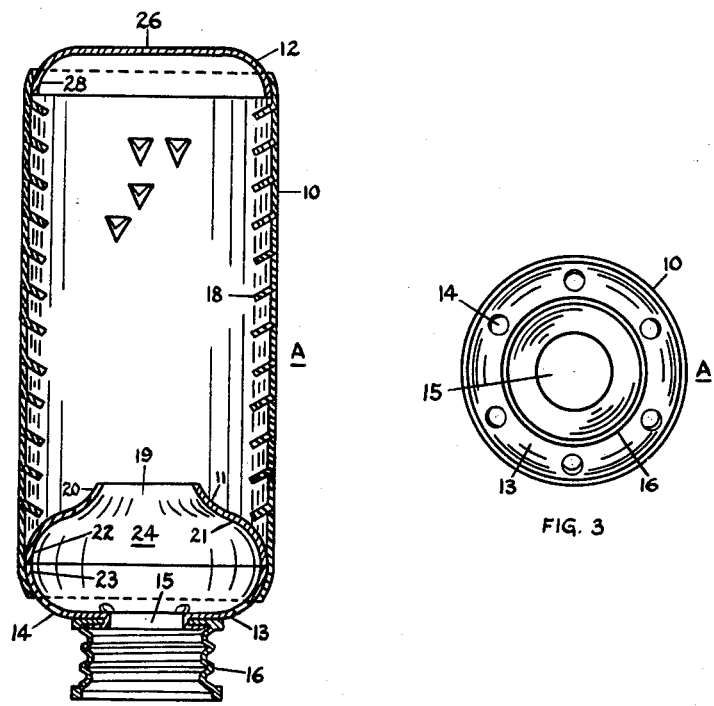
Figure 3:
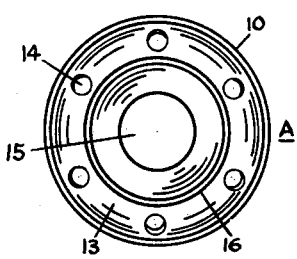

Other objects and advantages of the invention will be apparent from the following detailed description and drawing, wherein:

FIG. 1 is an elevation of an irrigator of the invention;
FIG. 2 is a cross-section taken along line 2—2 of FIG. 1; and
FIG. 3 is a plan view of the device of FIG. 1.

Referring now to the drawing, the principal parts of an irrigator A of our invention comprise an outer tubular member 10, an inner member 11, an imperforate cap 12, and an end cap 13 which includes orifices 14 and a central opening 15 to which a hose connection 16 is attached for introducing water under pressure to the interior of the tubular member 10.

The tubular member 10 is preferably made from a tube of metal cut to suitable length and is stamped to form a plurality of relatively small openings 17. The openings 17 are stamped into the wall of the tubular member 10 in such a manner that small, inwardly projecting baffles 18 are left standing adjacent each opening 17. The baffles 18 form an angle of less than 90° with the wall of the tubular member 10 and slope toward the inner member 11.

The inner member 11 is stamped from a circular piece of metal in substantially the shape shown in the drawing and includes an aperture 19 having an upstanding annular shoulder 20. The aperture 19 is of slightly larger diameter than the opening 15. The wall 21 of the inner member 11 slopes outwardly and downwardly from the shoulder 20 and terminates in a substantially vertical flange or shoulder 22. The flange 22 is similar in size and shape to an upstanding, encompassing wall 23 of end cap 13.

The inner member 11 is placed horizontally across one end of the tubular member 10 with the aperture 19 facing inwardly. The end cap 13 is then placed in the same end of the tubular member 10 with the wall 23 immediately adjacent the vertical flange 22 of the inner member 11, thus forming a chamber 24. The end cap 13 may be held in place by turning the end of the tubular member 10 inwardly on the end cap 13.

The imperforate cap 12 includes a relatively flat bottom wall 26 and an upstanding, encompassing sidewall 28. The cap 12 is held in place by spinning the tubular member 10 inwardly, as described above in connection with cap 13.

The irrigator A is connected to a well known garden hose, not shown. Water enters the chamber 24 and is charged with air that is drawn into chamber 24 through the orifices 14. Air-charged water leaves chamber 24 through aperture 19 and impinges against the bottom wall 26 of cap 12. The water then spreads across the bottom wall 26, flows down sidewall 28, along the inside wall of the tubular member 10 and against the outer surface of the inner member 11 which reflects the water back to the baffles 18. The baffles 18, in turn, deflect the water out through the openings 17. The water issues softly and gently in a uniform pattern around the entire outer circumference of the tubular member 10.

It will be clear to those skilled in the art that the device of the present invention provides an inexpensive and efficient irrigator for receiving water at high pressure and delivering it in maximum volume to a point of use at a minimum pressure.

According to the provisions of the patent statutes, we have explained the principle of our invention, and have illustrated and described what we now consider to represent its best embodiment. However, we desire to have it understood that, within the scope of the appended claim, the invention may be practiced otherwise than as specifically illustrated and described.

We claim:
In an irrigating device including a tubular member, an imperforate end cap and an end cap including a hose connection, the improvement comprising: perforations placed in longitudinal rows around the outer circumference of said tubular member; inwardly projecting baffles adjacent each perforation; and an aeration chamber adjacent said hose coupling; said aeration chamber including an inner member having an aperture with an upstanding shoulder, an outwardly sloping sidewall and a downwardly extending shoulder, said inner member being mounted horizontally in said tubular member adjacent said hose coupling.

References Cited in the file of this patent
UNITED STATES PATENTS

| | | |
|---|---|---|
| 2,420,958 | Landreth | May 29, 1947 |
| 2,515,600 | Hayes | July 18, 1950 |
| 2,644,719 | Thomas | July 7, 1953 |